United States Patent [19]

Mannik

[11] Patent Number: 5,232,285
[45] Date of Patent: Aug. 3, 1993

[54] OPTICAL ROTOR TEMPERATURE SENSING APPARATUS USING PHOSPHORS AND METHOD OF MEASURING THE TEMPERATURE AT THE BOTTOM OF A ROTOR SLOT IN A ROTATING ROTOR

[75] Inventor: Lennart Mannik, Ontario, Canada

[73] Assignee: Electric Power Research Institute, Inc., Palo Alto, Calif.

[21] Appl. No.: 922,133

[22] Filed: Jul. 30, 1992

[51] Int. Cl.$^5$ .................. G01K 11/20; G01K 13/08
[52] U.S. Cl. ................................ 374/131; 374/153; 374/159; 374/152; 374/161; 250/458.1; 250/459.1; 250/461.1
[58] Field of Search ............... 374/152, 153, 159, 161, 374/131, 166, 137, 124, 110; 250/458.1, 459.1, 461.1

[56] References Cited

U.S. PATENT DOCUMENTS

| | | | |
|---|---|---|---|
| 3,280,312 | 10/1966 | Sandelien | 374/153 |
| 3,731,536 | 5/1973 | Baumann et al. | 374/166 |
| 4,223,226 | 9/1980 | Quick et al. | 374/131 |
| 4,560,286 | 12/1985 | Wickersheim | 374/131 |
| 4,679,157 | 7/1987 | Hirano et al. | 374/159 |
| 4,729,668 | 3/1988 | Angel et al. | 374/161 |
| 4,789,992 | 12/1988 | Wickersheim et al. | 374/131 |
| 4,895,156 | 1/1990 | Schulze | 374/161 |

FOREIGN PATENT DOCUMENTS

| 1191593 | 4/1965 | Fed. Rep. of Germany | 374/153 |
|---|---|---|---|
| 2113837 | 8/1983 | United Kingdom | 374/159 |

OTHER PUBLICATIONS

Mannik et al., "The Application of Phosphor Thermometry to Generator Rotor Temperature Monitoring," Electrooptic Sensing and Measurement, ICALEO '87 Proceedings, Nov. 8-12, 1987, pp. 23-27.

*Primary Examiner*—William A. Cuchlinski, Jr.
*Assistant Examiner*—Diego F. F. Gutierrez
*Attorney, Agent, or Firm*—Flehr, Hohbach, Test, Albritton & Herbert

[57] ABSTRACT

A temperature sensing apparatus and method of measuring the temperature at the bottom of a rotor slot in a rotating rotor using a temperature sensitive phosphor material. The temperature sensitive phosphor material is placed at the bottom of a rotor slot and is excited, as the rotor rotates, by an excitation source located at a location opposite the rotor, the excited radiation being detected at two spaced locations from the excitation source, the two spaced locations being located also opposite the rotor and spaced apart along the direction of the rotor. Then the decay rate of the detected radiation from the phosphor is determined and from this decay rate the temperature at the bottom of the rotor slot.

6 Claims, 2 Drawing Sheets

OPTICAL ROTOR TEMPERATURE SENSING APPARATUS USING PHOSPHORS AND METHOD OF MEASURING THE TEMPERATURE AT THE BOTTOM OF A ROTOR SLOT IN A ROTATING ROTOR

BRIEF DESCRIPTION OF THE INVENTION

This invention relates generally to optical rotor temperature sensing apparatus, and more particularly, to such an apparatus for sensing temperature at the bottom of rotor cooling vent slots to monitor winding temperature.

BACKGROUND OF THE INVENTION

Large turbine generators contain cylindrical rotors up to 2 m in diameter which revolve at speeds of up to 3600 rpm. These rotors contain windings requiring electrical insulation to prevent inter-turn short circuits between the electrical conductors. If the electrical insulation becomes too hot, either due to improper operation or blocked cooling channels, the insulation degrades, eventually allowing inter-turn shorts to occur and leading to severe problems (including a rotor failure). Thus, there is a need to continuously measure the temperature of rotor windings, and in particular, the temperature of the hot spots of the winding. Such temperature information will provide an advance warning of when the insulation may fail. Currently the only rotor temperature information available is an average rotor temperature inferred from a resistance measurement. Temperature measurements with conventional methods are difficult due to the harsh environment existing within the rotor combined with a very high rotational speed of the rotor.

An indirect rotor temperature measurement can be implemented using a phosphor-based surface temperature measurement technique disclosed in U.S. Pat. No. 4,560,286. In this method a phosphor mixed with a suitable binder is painted on the surface of the rotor and an optical fiber is used to deliver pulsed ultraviolet light from a stationary source. This source (typically a laser) excites the phosphor to fluoresce in the visible light spectrum. The visible emission is delivered to the detector by a second optical fiber and the temperature of the illuminated surface is determined from an analysis of the decay time of this signal. Using this technique, the rotor surface temperature directly below an optical fiber can be measured, provided there is suitable fiber access, for example, via ventilation channels in the stator.

This method is only suitable for monitoring the surface temperature of the rotor, since the decay in the fluorescence must be visible by the second (receiving) fiber for several tens of microseconds. During this time, the rotor surface will move several centimeters, which the receiving fiber can accommodate in its field of view. However, it is the temperature of the insulation at the bottom of cooling vent slots, FIG. 1, that is of more importance in monitoring rotor winding insulation temperatures. Unfortunately, these vent slots are typically only 0.5 cm across and up to 10 cm deep. If the "standard" fluorescence technique is used, the receiving fiber cannot view the special phosphor paint long enough to determine the rate of light decay, since the rotor is moving.

OBJECTS AND SUMMARY OF THE INVENTION

It is an object of this invention to provide an optical temperature sensing apparatus capable of measuring the temperature at the bottom of cooling vent slots in the rotor of generators.

It is another object of this invention to provide an optical rotor temperature sensing apparatus which is economical and simple in construction and use.

The foregoing and other objects of the invention are achieved by a temperature sensing apparatus in which a phosphor located at the bottom is excited and emits energy whose intensity decays with time at a rate which is dependent on the temperature of the phosphor, the intensity of the emitted energy is detected at two times and the temperature is then obtained from decay rate temperature calibration data.

BRIEF DESCRIPTION OF THE DRAWINGS

The foregoing and other objects of this invention will be more clearly understood from the following description when read in conjunction with the accompanying drawings, wherein.

DESCRIPTION OF PREFERRED EMBODIMENTS

Figure 1:
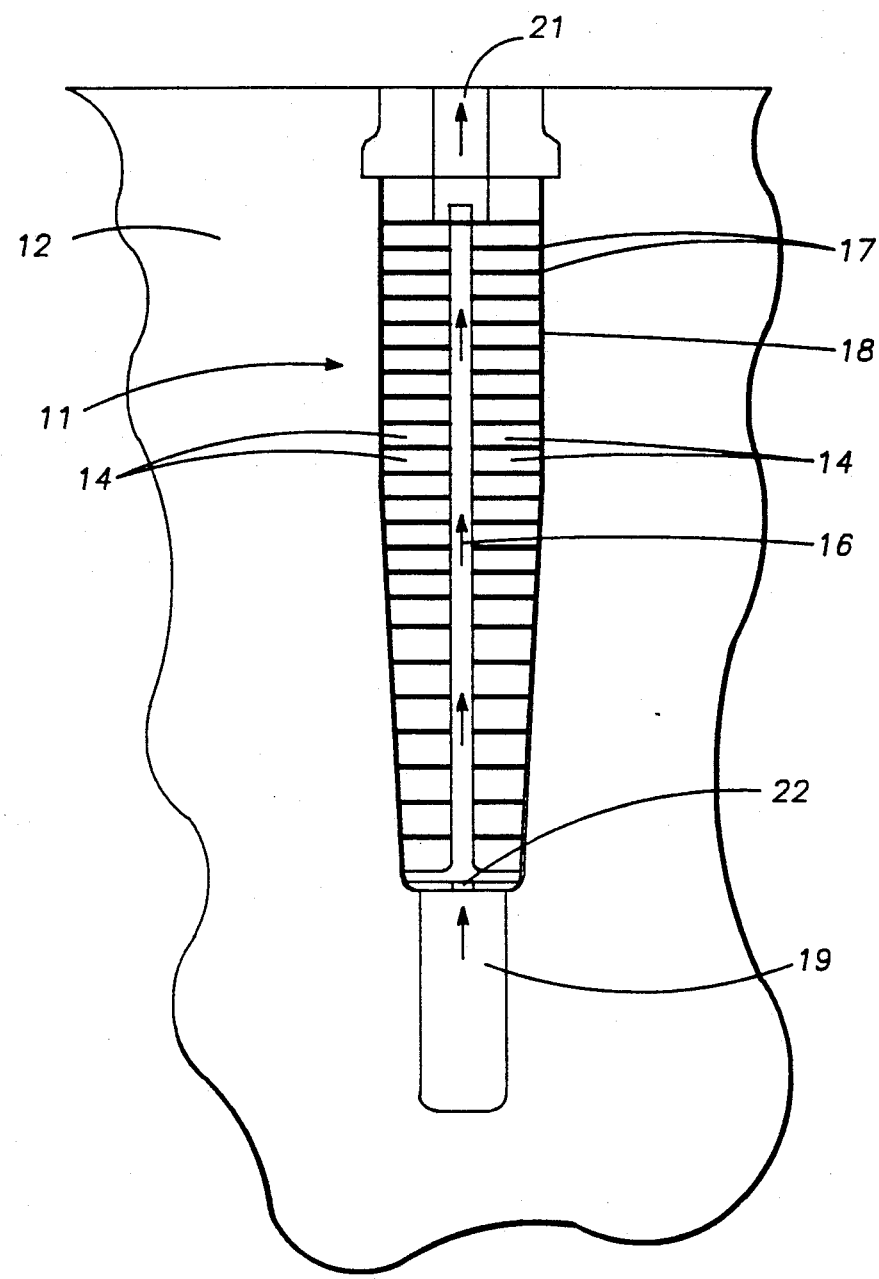
FIG. 1 is a partial sectional view of a rotor showing a rotor, rotor windings and vent slot.

FIG. 1 shows a typical rotor slot 11 formed in rotor 12. The rotor slots include turns of adjacent windings which are spaced to form a vent slot to receive cooling gas shown by arrows 16. The winding turns are separated by insulation 17, and are insulated from the rotor by slot insulation 18. A sub-slot 19 is shown at the bottom of the slot 11 and serves as a plenum for cooling gas. The cooling gas vents at 21.

As explained above, the critical location for temperature monitoring is the bottom of the vent slot as indicated at arrow 22. This gives a true indication of the temperature to which the winding and slot insulation is subjected.

In accordance with this invention, a phosphor paint is applied to the bottom of the slot. The phosphor paint is selected so that after it is excited with light energy, it emits energy which decays with time in a manner which is dependent on the temperature of the phosphor.

Figure 2:
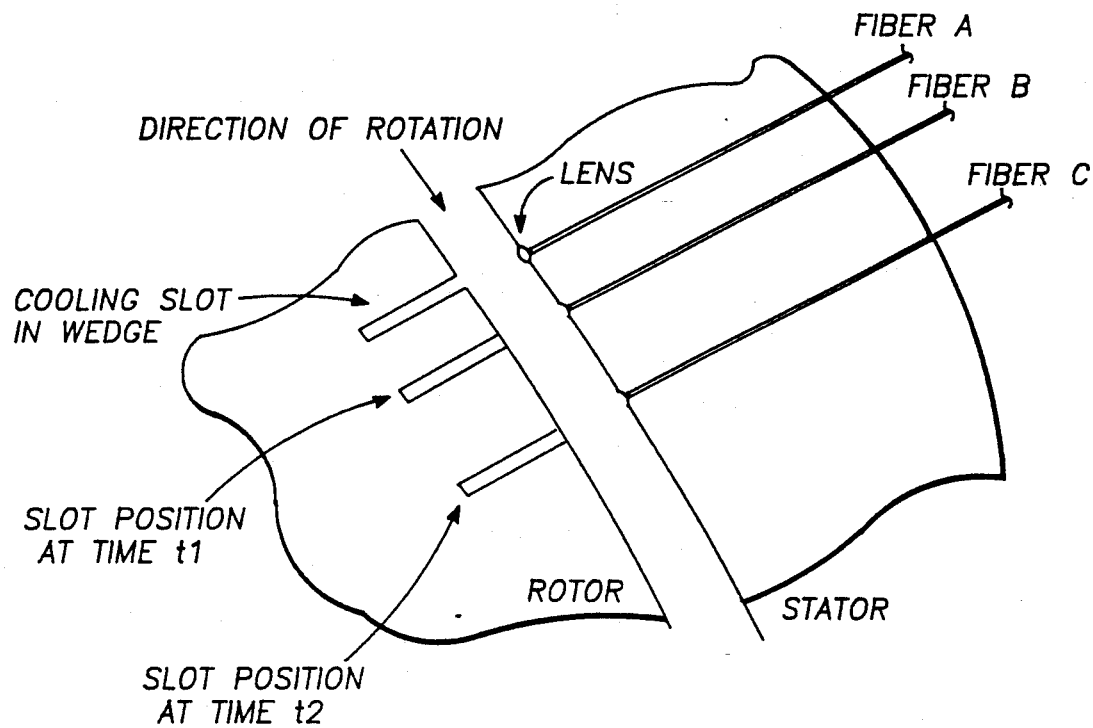
FIG. 2 is a partial sectional view of a rotor showing the vent slots at different times, the excitation optical fiber and the spaced detecting optical fibers.

The principal features of the invention are shown in FIG. 2, which shows a simplified cross-sectional view of a slot with a phosphor paint applied to the winding at the bottom of the vent hole. Three fibers are installed in the stator. At the initial time of excitation, fiber A lines up with the slot. At times t1 and t2 later, fibers B and C, respectively, line up with the slot. Typical values of t1 and t2 are microseconds and tens of microseconds, respectively, corresponding to a 1 mm separation for the A and B fibers and several mm separation for the B and C fibers.

Figure 3:
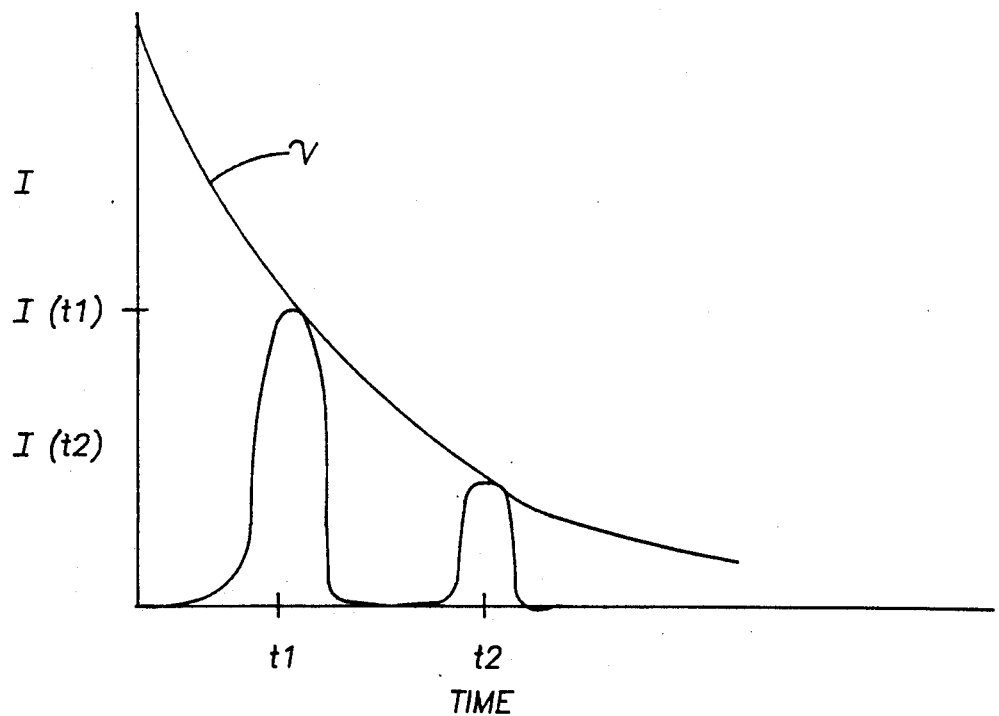
FIG. 3 shows the intensity of the emission signals detected by the spaced detecting optical fibers.

Fiber A is used to deliver the ultraviolet energy to excite the phosphor. A pulsed laser is the source of the ultraviolet light and a lens at the end of the fiber focuses the beam on the phosphor. Detectors 23, FIG. 4, connected to fibers B and C record a time varying phosphor emission signal, which reaches a maximum value when the fiber is lined up with the slot. These maximum intensities, which correspond to the phosphor emission at time t1 and t2, are labelled I(t1) and I(t2). This is illustrated in FIG. 3, which shows the decay curve and the detected emission at times t1 and t2 and the corresponding intensities.

The phosphor emission decays in an exponential manner with a characteristic decay time $\gamma$ dependent on the phosphor temperature. This is the basis of the phosphor-based temperature sensing technique of this invention. The relationship between the two measured signals is thus given by:

$$I(t2) = I(t1) \exp - \{(t2-t1)/\gamma\}$$

Figure 4:
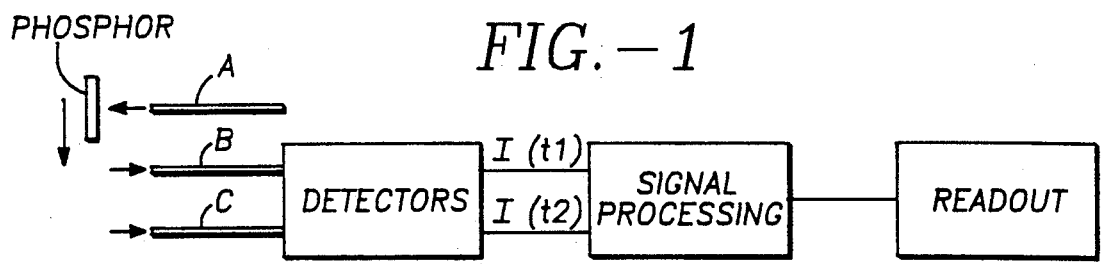
FIG. 4 is a schematic block diagram illustrating the signal processing.

Since t2−t1 is known from the separation of the fibers and the speed of the rotor, the decay time $\gamma$ can be determined. The temperature of the winding is then obtained by processing the signals and using a temperature calibration curve to provide a readout, as shown in FIG. 4.

Thus, there has been provided an improved system for measuring the temperature at the bottom of cooling vent slots.

What is claimed is:

1. An optical temperature sensing apparatus for sensing temperature at the bottom of a rotor slot in a rotating rotor comprising
    a phosphor material disposed at the bottom of the rotor slot, said material having the characteristic that after it is excited, it emits energy with an intensity that decays with time at a rate that is dependent on its temperature,
    means positioned adjacent said rotor for exciting said phosphor material as the rotor slot rotates past said exciting means,
    means positioned adjacent said rotor of two spaced locators from said exciting means and spaced along the direction of rotation of said rotor for detecting the emission at two spaced times to provide signals representative of the intensity of emission at said times, and
    means for processing said signals to determine the decay rate and using said decay rate to indicate the temperature.

2. Apparatus as in claim 1 in which the phosphor is excited by the end of an optical fiber whose other end is excited by a pulsed laser.

3. Apparatus as in claim 2 in which said means for detecting the emission at two spaced times comprises optical fibers spaced along the direction of rotation of said rotor to receive the emission at one end and supply it to detectors imposed at the other end of said fibers.

4. Apparatus as in claim 3 in which said intensity signals are represented by I(t1) and I(t2) which is the maximum intensity of emission detected by said detectors at the first and second fiber in direction of travel and wherein $I(t2) = I(t1) \exp - [(t2-t1)/\gamma]$ where $\gamma$ is the decay rate.

5. Apparatus as in claim 4 in which said processing means includes means for comparing the decay rate with known decay rates at different temperatures to determine the temperature of the phosphor and therefore, the rotor slot.

6. A method of measuring the temperature at the bottom of a rotor slot in a rotating rotor comprising the steps of
    placing a layer of phosphor at the bottom of the slot, said phosphor being characterized by emitting radiation when excited, the intensity of said radiation decaying with time at a rate which is dependent upon the temperature of the phosphor,
    exciting said phosphor with an excitation source located at a first location opposite said rotor to cause the phosphor to emit energy as the rotor slot rotates past said excitation source,
    detecting the intensity of the emitted energy at two spaced locations from said excitation source, said two spaced locations located opposite the rotor and spaced along the direction of rotation of the rotor to provide two intensity signals following excitation, processing said signals to determine the decay rate of the energy emitted by the phosphor, and determining the temperature at the bottom of the rotor slot in the rotating rotor from said decay rate.

* * * * *